United States Patent
So

(10) Patent No.: US 9,781,084 B2
(45) Date of Patent: Oct. 3, 2017

(54) REDUCING START-UP DELAY IN STREAMING MEDIA SESSIONS

(71) Applicant: ARRIS Enterprises, Inc., Suwanee, GA (US)

(72) Inventor: Nicol C. P. So, Newtown, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/603,534

(22) Filed: Jan. 23, 2015

(65) Prior Publication Data

US 2016/0219023 A1    Jul. 28, 2016

(51) Int. Cl.
*H04L 29/06*  (2006.01)
*H04N 7/167*  (2011.01)
(Continued)

(52) U.S. Cl.
CPC .......... *H04L 63/0442* (2013.01); *H04L 63/06* (2013.01); *H04L 63/105* (2013.01); *H04L 65/604* (2013.01); *H04L 65/608* (2013.01); *H04N 7/1675* (2013.01); *H04N 21/235* (2013.01); *H04N 21/2347* (2013.01); *H04N 21/2351* (2013.01); *H04N 21/2389* (2013.01); *H04N 21/23614* (2013.01);
(Continued)

(58) Field of Classification Search
CPC .......................... H04N 7/17318; H04N 7/1675
USPC ........ 713/160, 164, 166, 168; 380/200, 210, 380/211
See application file for complete search history.

(56) References Cited

U.S. PATENT DOCUMENTS

| 7,113,523 B1 | 9/2006 | Kubota et al. | |
| 7,239,705 B2 * | 7/2007 | Kelley | H04N 7/162 348/E7.056 |

(Continued)

FOREIGN PATENT DOCUMENTS

| EP | 2429189 A1 | 3/2012 |
| WO | 2012/092423 A2 | 7/2012 |

(Continued)

OTHER PUBLICATIONS

"Secure and Private Distribution of Online Video and Some Related Cryptographic Issues"—Bao et al, Kent Ridge Digital Labs, Mar. 2001 http://www3.ntu.edu.sg/home/wuhj/research/publications/2001_ACISP_PD.pdf.*

(Continued)

*Primary Examiner* — Randy Scott
(74) *Attorney, Agent, or Firm* — Thomas A. Ward

(57) ABSTRACT

A method is provided for delivering a streaming media asset to a client device. For the method, a request is received over a communication network from a client device for playing a media asset in accordance with a streaming media technique. Prior to fully authorizing the client device to play the media asset, the client device is provided with access to a first cryptographic key that decrypts a subset of the media asset so that the client device is able to render the subset of the media asset before completion of the authorization. The subset of the media asset is less than all of the media asset. Subsequent to successfully fully authorizing the client device to play the media asset, the client is provided with access to at least one additional cryptographic key that decrypts a remainder of the media asset.

15 Claims, 6 Drawing Sheets

(51) Int. Cl.

| | | |
|---|---|---|
| *H04N 21/2347* | (2011.01) | |
| *H04N 21/235* | (2011.01) | |
| *H04N 21/236* | (2011.01) | |
| *H04N 21/2389* | (2011.01) | |
| *H04N 21/262* | (2011.01) | |
| *H04N 21/266* | (2011.01) | |
| *H04N 21/435* | (2011.01) | |
| *H04N 21/438* | (2011.01) | |
| *H04N 21/4385* | (2011.01) | |
| *H04N 21/4405* | (2011.01) | |
| *H04N 21/4627* | (2011.01) | |
| *H04N 21/482* | (2011.01) | |
| *H04N 21/61* | (2011.01) | |
| *H04N 21/845* | (2011.01) | |

(52) U.S. Cl.
CPC . *H04N 21/26258* (2013.01); *H04N 21/26613* (2013.01); *H04N 21/435* (2013.01); *H04N 21/4384* (2013.01); *H04N 21/4385* (2013.01); *H04N 21/4405* (2013.01); *H04N 21/44055* (2013.01); *H04N 21/4627* (2013.01); *H04N 21/4825* (2013.01); *H04N 21/6125* (2013.01); *H04N 21/8456* (2013.01)

(56) References Cited

U.S. PATENT DOCUMENTS

| | | | |
|---|---|---|---|
| 2002/0083438 A1 | 6/2002 | So et al. | |
| 2005/0100167 A1* | 5/2005 | Alve | H04N 7/163 380/277 |
| 2006/0095792 A1* | 5/2006 | Hurtado | G06F 21/10 713/189 |
| 2008/0170687 A1* | 7/2008 | Moors | H04N 7/165 380/200 |
| 2012/0017282 A1 | 1/2012 | Kang et al. | |
| 2014/0156800 A1* | 6/2014 | Falvo | H04N 21/8456 709/219 |
| 2014/0282689 A1* | 9/2014 | Kummer | H04N 21/4408 725/31 |
| 2014/0317244 A1 | 10/2014 | Pantos et al. | |

FOREIGN PATENT DOCUMENTS

| | | | | |
|---|---|---|---|---|
| WO | 2014/090761 A1 | 6/2014 | | |
| WO | WO 2014090761 A1 * | 6/2014 | ....... | H04N 21/26258 |

OTHER PUBLICATIONS

PCT Search Report & Written Opinion, Re: Application No. PCT/US2016/013282, dated May 4, 2016.

* cited by examiner

REDUCING START-UP DELAY IN STREAMING MEDIA SESSIONS

BACKGROUND

Streaming media systems are being used to transmit video and audio content over the Internet and other communication networks to devices that output the content for rendering by a user. Adaptive bitrate (ABR) streaming is a streaming technology that is rapidly being adopted for commercial real-time distribution of video and other media assets and is a technique used in streaming multimedia over computer networks. While in the past video streaming technologies often utilized streaming protocols such as the real-time transport protocol (RTP) with real-time streaming protocol (RTSP), today's adaptive streaming technologies are largely based on the hypertext transport protocol (HTTP) and are designed to work efficiently over large distributed HTTP networks such as the Internet.

It is commonplace to stream media assets that have been pre-encrypted to ensure that only the intended recipient or recipients are able to render the streaming media. Such pre-encrypted content is made available to users in a variety of contexts including, for example, on-demand contexts such as during a video-on-demand (VOD) session.

Streaming technologies provide users with nearly immediate access to a wide range of content, virtually whenever they want it. Despite these potential advantages offered by streaming technologies, there is often a delay between the time a user requests a streaming media asset and the time when a pre-encrypted media asset actually begins to be rendered. This delay may be caused by any of a variety of transactions that may be required to authorize the user and/or the user's device. These transactions may require the user to participate in such things as registration, log-in and payment processes, for example.

SUMMARY

In accordance with one aspect of the invention, a method is provided for delivering a streaming media asset to a client device. In one implementation a request from a user is received over a communication network from a client device for playing a media asset in accordance with a streaming media technique. Prior to fully authorizing the client device to play the media asset, the client device is provided with access to a first cryptographic key that decrypts a subset of the media asset so that the client device is able to render the subset of the media asset before completion of the authorization. The subset of the media asset is less than all of the media asset. Subsequent to successfully fully authorizing the client device to play the media asset, the client device is provided with access to at least one additional cryptographic key that decrypts a remainder of the media asset.

DETAILED DESCRIPTION

Figure 1:
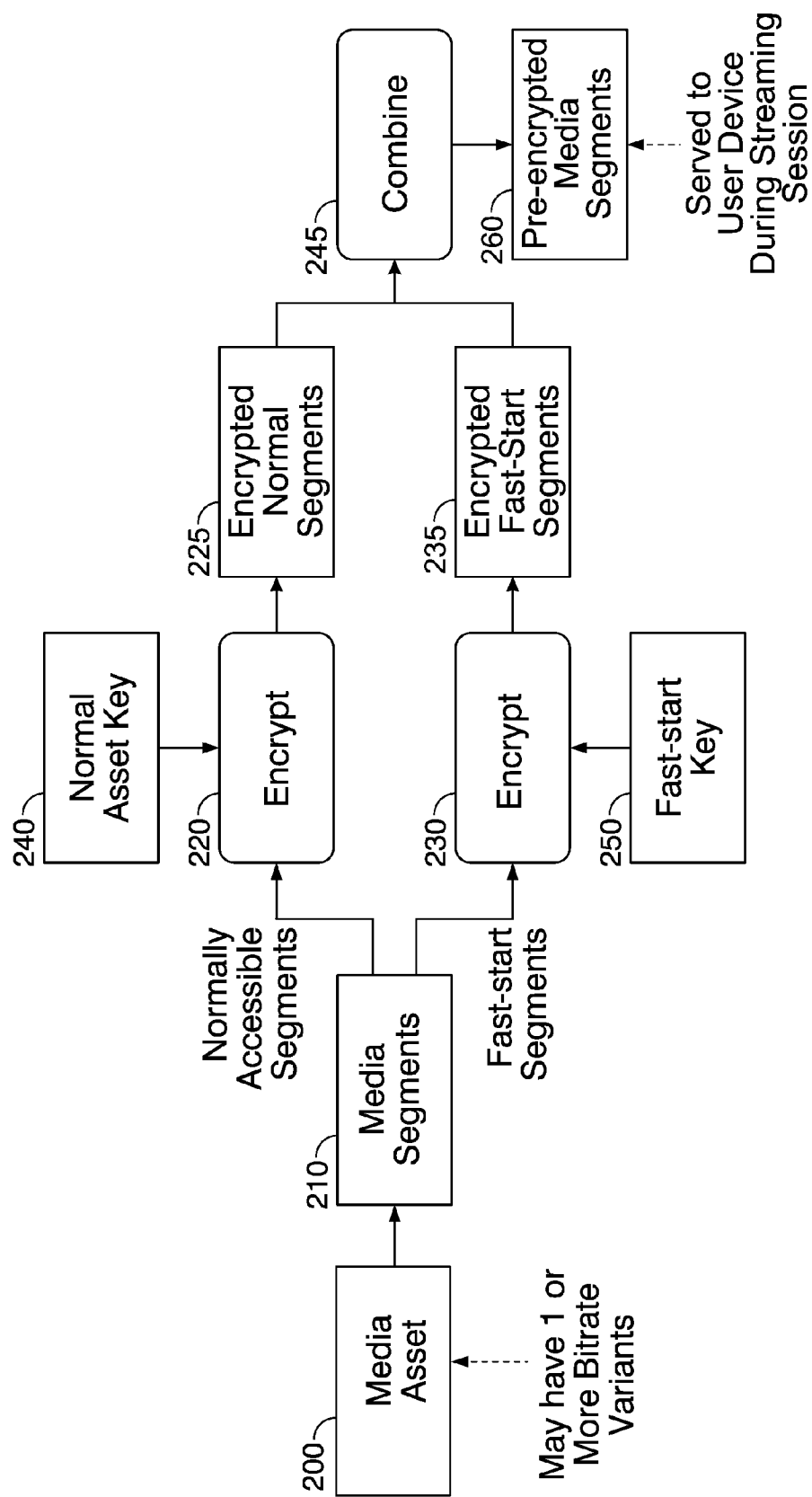
FIG. 1 illustrates one example of a process used to encrypt a media asset in accordance with the subject matter described herein.

As detailed below, the subject matter described herein is able to reduce the time interval between the time when a user first requests delivery of an encrypted streaming media asset and the time at which the user's device is actually able to begin rendering the media asset. In particular, in some implementations start-up delays arising from the need to conduct business transactions and security-related provisioning are reduced or even eliminated. This increased responsiveness may be achieved in some embodiments by protecting (e.g., encrypting) portions of the media asset that are to be initially delivered to the user with a different cryptographic key than is used to protect the remaining portions of the media asset. The portions of the media asset that are to be initially delivered to the user are often referred to herein as "fast-start" portions and the cryptographic keys used to protect the fast-start portions are often referred to herein as "fast-start" keys.

In some embodiments, when a user requests delivery of an encrypted streaming media asset the user is provided with the fast-start key(s) even before some or all of the processing needed for business (e.g., billing, accounting), authentication, and/or security purposes is completed in order to authorize playback of the decrypted media asset by the user's device. Once such processing is completed, the user is provided with access to the cryptographic key(s) that are to needed to render the subsequent portions of the media asset. In some implementations the times at which the user is provided with access to the fast-start key(s) and the remaining key(s) are coordinated so that the user will be able to seamlessly render the start-up media portions and the remaining media portions without interruption.

As used herein "streaming media" are media received by and presented to an end-user while being delivered by a streaming source using any available streaming technique. In streaming media applications, streaming audio and/or video data may be played back without the complete media asset first being completely downloaded. Streaming media may thus be viewed or listened to in "real-time" as the data is received. Streaming media may be user-controlled (e.g., on-demand, pay-per-view movies, etc.) or server-controlled (e.g., webcasting).

While some streaming media techniques deliver the media assets in a continuous fashion, generally speaking, streaming media is commonly delivered in "segments" (alternatively known as "chunks") through the network to the client (e.g., the media player). Each chunk or segment will typically contain the video and/or audio information required to render a selected duration, such as ten seconds, of the media at a given resolution or playback quality. When the media player renders a media asset program, it downloads a manifest, which may be embodied as one or more data objects, that identifies and describes the chunks making up the program and the player downloads the first one or more chunks of the program specified by the manifest into a player cache and begins playback with those chunks while the next needed chunks, as defined by the manifest, are being downloaded through the network. In this manner, playback of the media asset can start before the entire asset has been downloaded.

When the techniques described herein are employed in connection with steaming media techniques delivered in chunks or segments, one or more of the chunks or segments may be encrypted using a fast-start key while the remaining segments may be encrypted using a key that is only made available after the user has been fully authorized to receive the media asset by completing all of the requisite business, security and other processes. In the foregoing, a key may include parts each of which is used as a key in some cryptographic process, such as encryption and authentication. In other words, a key is potentially a composite object, but it need not be so. In addition, a key may be used to protect media segments directly or indirectly. In the latter case, the key is used to decrypt or otherwise derive one or more further keys, which are used directly in the encryption of media segments. In this document, when a key is said to be used to encrypt or decrypt media segments, the possibility of the key being used indirectly is also included. It should be noted, however, that the techniques described herein are equally applicable to all streaming media techniques, and not just those in which the media is delivered in chunks or segments.

FIG. 1 illustrates one example of a process used to encrypt a media asset in accordance with the subject matter described herein. As shown, an unencrypted media asset 200 is divided into a series of media segments 210 that may each be downloadable by a client device as part of a streaming media process. Segments that are designated as fast-start segments are encrypted at process step 230 with a fast-start key 250 to produce fast-start encrypted segments 235. Likewise, segments that are designated as normally-accessible segments (i.e., segments made usable after the user and/or the client device has been authorized to play them) are encrypted at process step 220 with the normal asset key 240 to produce normally accessible encrypted segments 225. Finally, the fast-start encrypted segments 235 and the normally accessible encrypted segments 225 are combined at process step 245 in the correct sequential order to form the pre-encrypted media asset 260 that is served to a client device during a streaming session.

The segments of a media asset that are chosen for encryption with a fast-start key may differ depending on the applications and circumstances in which the media asset is to be employed. For example, in some embodiments the first of every x segments (e.g., 5 segments) are chosen to be fast-start segments. That is, in this particular embodiment the fast-start segments are evenly spaced from one another and constitute about 20% of the total content of the media asset. Fast-start segments may be distributed uniformly or non-uniformly throughout the media asset. In some embodiments, multiple fast-start segments may occur at the beginning of the media asset, while fast-start segments may occur less frequently in the remainder of the media asset. In some embodiments, fast-start segments may stop being present after some point in the media asset. For instance, the fast-start segments may be selected so that when a user requests a streaming session, the user's client device will render a suitable fast-start segment(s) as the starting point. If the user is starting a session from the beginning of a media asset, for instance, the fast-start segment(s) may be the first segment of the asset. If, on other hand, the user is resuming a previous session (say using a feature commonly referred to "bookmarking"), the fast-start segment may be the fast-start segment closest in time to, but preferably but not necessarily no later than, the segment which otherwise would be the point of resumption.

The fast-start mechanism described herein may be used in conjunction with a variety of different streaming techniques. One example of such a technique, which will be described herein by way of example only and not as a limitation on the subject described herein, is referred to as Adaptive Bit Rate ("ABR") streaming ABR streaming is a technology that works by breaking the overall media stream or media file into a sequence of small HTTP-based file downloads, each download loading one short segment of an overall potentially unbounded transport stream or media elementary streams. As the stream is played, the client may select from a number of different alternate streams containing the same material encoded at a variety of data rates, allowing the streaming session to adapt to the available data rate. The alternative streams are generally divided at the same points in time so that the different streams have segments that correspond to one another.

At the start of the streaming session, the player downloads a manifest containing the metadata for the various sub-streams which are available. Since the requests use only standard HTTP transactions, ABR streaming is capable of traversing a firewall or proxy server that lets through standard HTTP traffic, unlike UDP-based protocols such as Real-Time Transport Protocol. This also allows a content delivery network to readily be implemented for any given stream. ABR-streaming methods have been implemented in proprietary formats including HTTP Live Streaming (HLS) by Apple, Inc., and HTTP Smooth Streaming by Microsoft Corporation. The international standard ISO/IEC 23009-1, entitled "Information Technology—Dynamic adaptive streaming over HTTP: Part 1: Media presentation description and segment formats", provides a standardized manifest format for communicating available media segments and associated information to streaming clients.

An increasing number of media players are able to receive video content via ABR streaming. The media player, using the HTTP Live Streaming format, for instance, receives the manifest as an m3u8 file that contains links, media uniform resource identifiers (URLs), to each of the segments or "chunks" of media content, and processes the manifest file to retrieve and play back each media segment in turn. In this disclosure, HLS represents the range of protocols that segment media content and employ a playlist or manifest file to manage playback.

Figure 2:
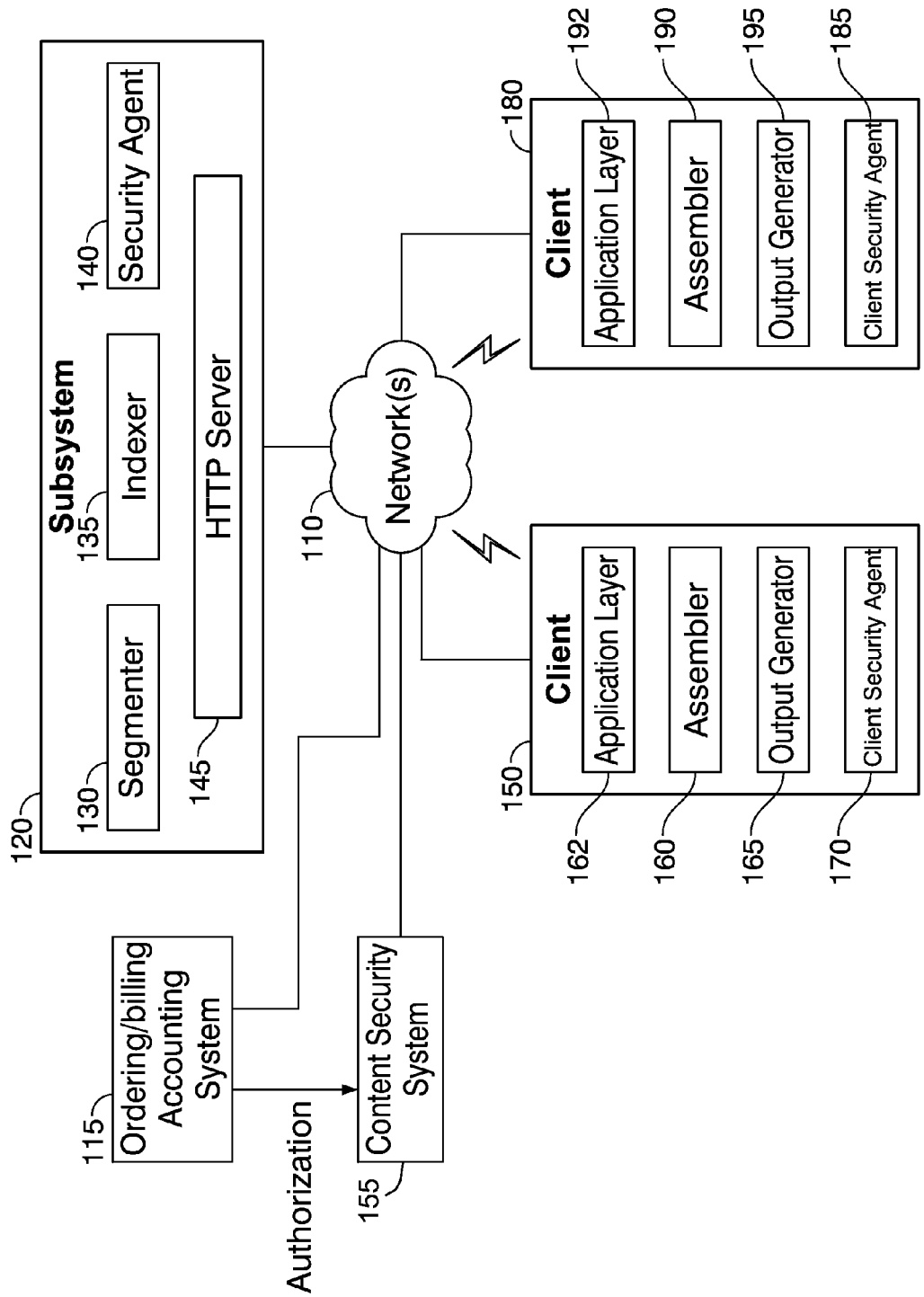
FIG. 2 is a block diagram of one embodiment of a server and clients that can send and receive streaming media.

FIG. 2 is a block diagram of one embodiment of a server and clients that can send and receive streaming media. Also shown in FIG. 2 are a content security system 155 and an ordering/billing/accounting system that may be associated with the server. The server, content security system and ordering/billing/accounting system may operate under the control of a common entity or different entities. Examples of content security systems include what are often called "conditional access systems" (CAS) and "digital rights management (DRM) systems". Many examples of such systems are known, including MediaCipher and SecureMedia from ARRIS Group, Inc. Other examples of commercially available content security systems include PlayReady (from Microsoft Corp.), Adobe Access (from Adobe), OMA (licensed by CMLA), Widevine DRM (from Google, Inc.), and Marlin (licensed by Marlin Trust Management Organization).

The example of FIG. 2 provides a simple server-client connection in which two clients communicate with the server via a communications network. Any number of clients may be supported utilizing the techniques and mechanisms described herein. Further, multiple servers may provide content and/or may operate together to provide content according to the techniques and mechanisms described herein. For example, one server may create the content, create the manifests and create the multiple media segments and other servers store and transmit the created content.

Subsystem 120, which in some embodiments may be a part of HTTP server, may operate in any manner known in the art. Turning to the internal components of subsystem 120, subsystem 120 includes a HTTP server component 145 that provides content using HTTP protocols. While the example of FIG. 2 is described in terms of HTTP, other transfer protocols can be utilized in a similar manner. Segmenter 130 and indexer 135 are components that form part of subsystem 120 to provide content in media segments with a manifest file as described herein. The functions of these components may include segmenting media stream(s) at one or more bitrates, formatting the segmented media stream(s) according to a defined streaming standard, encrypting the media segments, and generating one or more accompanying manifest files. These media segments and manifest files may be provided over network 110 via HTTP server component 145 (or via other servers) using HTTP protocols. Components as discussed herein can be implemented as hardware, software, firmware or a combination thereof.

Network 110 may be any type of network whether wired, wireless or any combination thereof. For example, network 110 may be the Internet or an intranet. As another example, network 110 may be a cellular network (e.g., 3G, CDMA). In yet another example, network 110 may be a content delivery system such as a broadcast television network, cable data network (e.g. an all-coaxial or a hybrid-fiber/coax (HFC) network), an xDSL (e.g., ADSL, ADLS2, ADSL2+, VDSL, and VDSL2) system, or a satellite television network. In yet other examples the network 110 may be a combination of two or more different types of networks.

Segmenter 130 may function to divide the stream of media data into multiple media files or segments that may be transmitted via HTTP protocols. Indexer 135 may function to create a manifest file corresponding to the segmented media files so that client devices can reassemble the media segments to provide real-time, or near real-time, transmission of the content provided by subsystem 120. In response to one or more requests from a client device, HTTP server component 145 (or other servers) may transmit one or more manifest files as generated by indexer 135 and media segments of content as generated by segmenter 130. Subsystem 120 also includes security component 140 that provides one or more security functions (e.g. encryption) in coordination with content security system 155. For example, security components 140 may receive cryptographic keys from the content security system 155 which are used to encrypt the media assets before delivery to the client devices.

Subsystem 120 may also include additional components not illustrated in FIG. 2.

Client devices 150 and 180 may receive the manifest files and media segments from subsystem 120 over network 110. Client devices may be any type of electronic device that are capable of receiving data transmitted over a network and generate output utilizing the data received via the network. For example, client devices 150 and 180 may be wireless mobile devices, smartphones, tablets, PDAs, entertainment devices, consumer electronic devices, PCs, set-top boxes, etc. The output may be any media type or combination of media types, including, for example, audio, video or any combination thereof.

Client device 150 can include an application layer 162 that may provide, among other things, a user interface that allows the user to interact with a system represented in FIG. 1 by ordering/billing/accounting system 115, which allows the user to request media assets and conduct various business-related tasks needed for the request to be fulfilled. Similarly, client device 180 can include application layer 192.

Client device 150 can also include assembler component 160 and output generator component 165. Similarly, client device 180 can include assembler component 190 and output generator component 195. Assembler components 160 and 190 receive the manifest files from subsystem 120 and use the manifest files to access and download media segments from subsystem 120. Output generator components 165 and 195 use the downloaded media segments to generate output from client devices 150 and 160, respectively. The output may be provided by one or more speakers, one or more display screens, a combination of speakers and display screens or any other output device. The client devices can also include memory (e.g. flash memory or RAM, etc.) to act as a buffer to store the media segments (e.g. compressed media files or decompressed media files) as they are received; the buffer can provide many seconds worth of presentable content beyond the time of content currently being presented so that the buffered content can later be displayed while new content is being downloaded. This buffer can provide presentable content while the client device is attempting to retrieve content through an intermittently slow network connection and hence the buffer can hide network latency or connection problems.

Client devices 150 and 180 further include client security components 170 and 185, respectively that provide various security functions. For example, the client security components 170 and 185 may communicate with the content security system 155 to obtain the cryptographic keys needed to decrypt the media assets. The content security system 155 may provide the client devices with access to the keys upon receiving authorization from the ordering/billing/accounting system 115. In some implementations, however, such authorization may not be required before the content security system 155 allows the client device access to the fast-start key.

Client devices 150 and 180 may also include additional components not illustrated in FIG. 2.

A client device, e.g., client device 150 or 180, initiates communication with the subsystem 120 by sending a request to the subsystem 120 for playback of media content. The subsystem 120 then generates or fetches a manifest file to send to the client device in response to the request. As explained in more below, the manifest file may specify how the client device is to access the key that is needed to decrypt the media content. In any case, in a conventional arrangement access to the key is generally not granted until various business, authentication and/or security processes are performed to authorized the user and/or client device. In the present case, however, the client device is able to access the fast-start key(s) before completion of all business, authentication and/or security processing.

Example formats for the manifest file include the m3u and m3u8 formats. An m3u8 file is a specific variation of an m3u encoded using UTF-8 Unicode characters. The m3u file format was initially used in the WINAMP Media Player for audio-only files but has since become a de facto manifest standard used on many client devices for local or streaming media, including music and other media types. Many client devices employ variations of the m3u file format, any of which can be used according to the present disclosure. A manifest file can include links to media segments as relative or absolute paths to a location on a local file system or as a network address, such as a Uniform Resource Indicator (URI) path. The m3u8 format is used herein as a non-limiting example to illustrate the principles of manifest files including non-standard variants.

The manifest file includes a list of URIs to different representations of the requested segmented media content. Before or at the time of the request, the subsystem 120 generates or identifies the media segments of the requested media content as streaming media content. The media segments of the streaming media content are generated, either by the subsystem 120, by the content producer, or by some other entity, by splitting, transcoding or transrating and encrypting the original media content. Upon receiving the manifest file, the client can fetch a first media segment or chunk for playback from the streaming media content then, during playback of that media segment, fetch a next media segment for playback after the first media segment, and so on until the end of the media content is reached. Table 1 presents the contents of one example of an m3u8 manifest file for a 22-second video program. The manifest file includes URIs for 3 media segments denoted chunk1.ts to chunk3.ts METHOD parameter of the EXT-X-KEY tag specifies the encryption method. In the same tag, a URI parameter, if present, specifies how to obtain the key, and an IV parameter, if present, specifies an initialization vector used in the encryption method (in combination with the key).

An encryption method of NONE indicates no encryption and if NONE is indicated then, in one embodiment, the URI and IV parameters should not be present. Various encryption methods may be used, for example AES-128, which indicates encryption using the Advance Encryption Standard encryption with a 128-bit key and PKCS7 padding [see RFC3852].

An EXT-X-KEY tag with a URI parameter identifies a key file. A key file may contain the cipher key that is to be used to decrypt the following media segment listed in the playlist file. For example, the AES-128 encryption method uses 16-octet keys. The format of the key file can be a packed array of 16 octets in binary format.

As shown in Table 1, the manifest file contains references to a key for the fast-start segment and to another one for the remaining segments. Once the business, authentication, authorization and/or security processing is complete, the server will provide the key to a client to enable the remaining media segments are to be played.

TABLE 1

```
#EXTM3U
#EXT-X-MEDIA-SEQUENCE:0
#EXT-X-TARGETDURATION:10
#EXTINF:10, Fast-Start Segment
#EXT-X-KEY:METHOD=AES-128,URI="https://keys.example.com/H4sIADovhlQ
AA+yaCVwTV7fAb9i3CLKJCjoqKighKwnEoiIgi7IIiCioTJKBBEISkoBgxaVuLegT
"
http://streaming.example.com/chunk1.ts
#EXT-X-KEY:METHOD=AES-128,URI="https://keys.example.com/sdWCL8kpL61
kiX0vSY3NiGsvzNi+wb3r/36bWpXxgqWVyTHGZHAaHE7ebp7kNNvUwLDAdVJ
upmZx"
#EXTINF:10, Normally-Accessible Segment
http://streaming.example.com/chunk2.ts
#EXTINF:2, Normally-Accessible Segment
http://streaming.example.com/chunk3.ts
#EXT-X-ENDLIST
```

The illustrative manifest file shown in Table 1 is an extended M3U manifest that employs tags that effectively extend the M3U format. The tags can be used by the server to organize, transmit and process the media segments that represent the original media content. The client devices use this information to reassemble and present the media segments. For instance, the EXT-X-MEDIA-SEQUENCE tag can indicate the sequence number of the first URI that appears in a manifest file. Likewise, the EXT-X-TARGETDURATION tag can indicate the approximate duration of the next media segment that will be added to the presentation.

EXTINF is a record marker that describes the media file identified by the URI that follows the tag. In one example, each media file URI is preceded by an EXTINF tag, for example:

EXTINF: <duration>,<title> where "duration" specifies the duration of the media file and "title" is the title of the target media file. In Table 1, chunk1 is entitled "Fast-start segment" and chunks 2 and 3 are entitled "Normally-Accessible Segment."

Also shown in the illustrative manifest file shown of Table 1 is the EXT-X-KEY tag, which provides information that can be used to decrypt the media segment that follows it. The In the example described above, the fast-start key was used to decrypt a portion of the media asset that had already been defined by dividing the media asset in order to stream the media asset. That is, this portion that can be decrypted by the fast-start key corresponds to a segment or chunk that is specified in a manifest file and which can be individually downloaded by the client device. However, in other embodiments the portion of the media asset that can be decrypted by the fast-start key need not correspond to one or more complete segments or chunks that are specified in the manifest file. In other words, in this embodiment there is not necessarily a one-to-one correspondence between the portion of the media asset that can be decrypted by the fast-start key and a streaming media segment.

Figure 3:
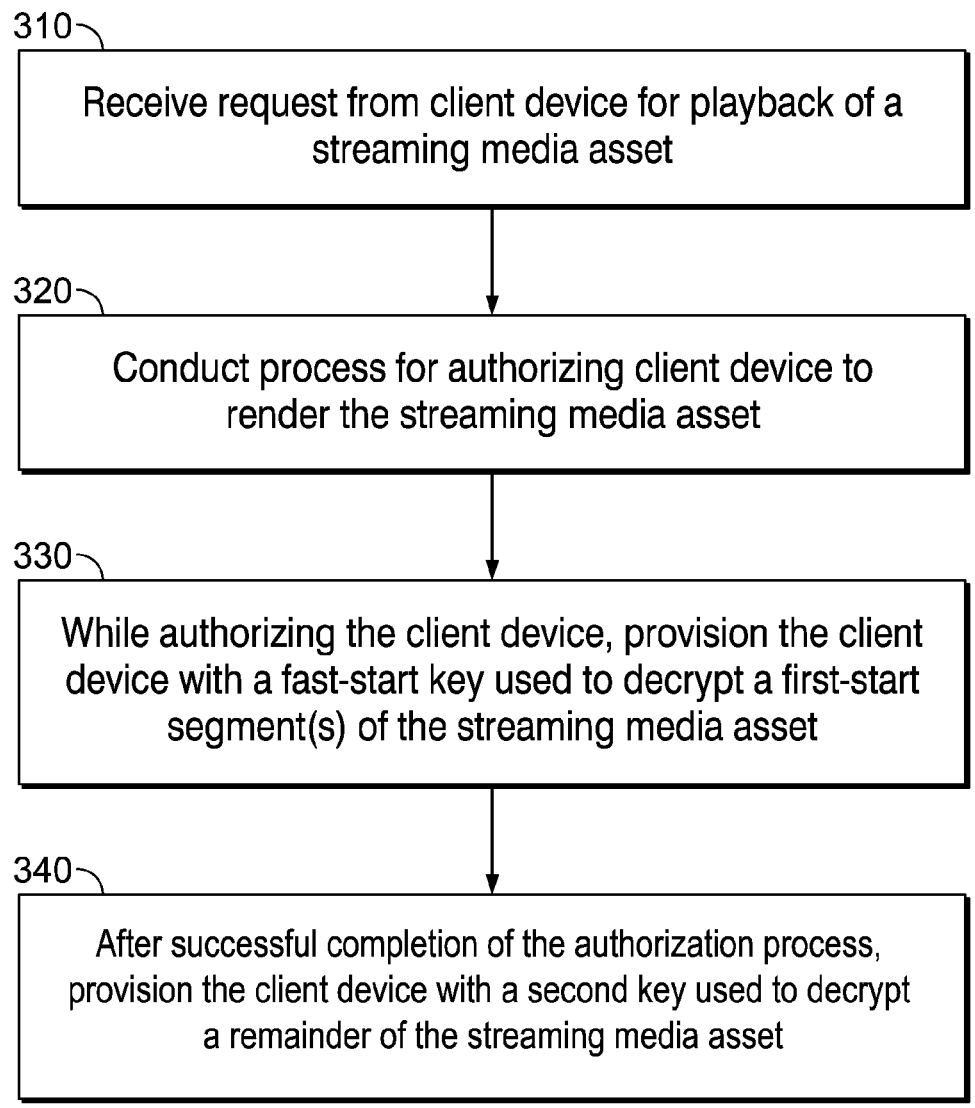
FIG. 3 is a flowchart showing one example of a method for delivering a streaming media asset to a client device.

FIG. 3 is a flowchart showing one example of a method for delivering a streaming media asset to a client device. The method begins at block 310 when the server or the ordering/billing system (e.g. ordering/billing/accounting system 115 in FIG. 1) receives a request over a communications network from a client device for playback of a media asset in accordance with a streaming media technique. After receiving this request (either directly from the client device or from the server), the ordering system begins to perform the various processes at block 320 which need to be completed before the client device is authorized to begin rendering the media asset. For example, if the media asset involved is a rental or pay-per-view asset, a business transaction may be involved. The user and/or the user's client device may need to be authenticated. The user's account profile may need to be checked for permission to make VOD purchases. The user's account balance may need to be checked before the transaction is approved or a credit card payment may need to be approved. Completion of the business transaction may require transaction records be committed to persistent data store. For assets that do not incur an incremental charge or assets that have already been purchased, starting a streaming session may still involve an authorization check.

Next, at block 330, while the processes of block 320 are being performed, but before they are completed to fully authorize the client device, the fast-start key(s) are provisioned to the client. The fast-start key(s) may be provisioned after only a simplified validation process is conducted, which is less rigorous/thorough than the processes that are to be completed at block 320 before the client device is fully authorized to receive the normal asset key(s) so as to be able to render the complete media asset. The simplified validation process may consist of, for example, verifying that the client device is a valid device registered with the content security system. Subsequent to successfully fully authorizing the client device to play the media asset, at block 340 the client device is provided with access to at least one additional cryptographic key that decrypts a remainder of the media asset. If the client device is not fully authorized to render the media asset (e.g., because the business transaction or authentication process fails), the client device will not be provisioned with the cryptographic key(s) needed to render the remainder of the media asset other than the fast-start segment(s) and the streaming process will be terminated.

The provisioning of the client device with the various cryptographic keys in blocks 330 and 340 may of course require an additional series of steps involving communication between the content security system, the ordering/billing system, the server and the client device, depending on the nature of the content security system that is employed, the type of media session involved, and other factors. Such processes are well-known and do not need to be further discussed herein.

In some embodiments, the provisioning of client device with the fast-start key may occur before the user has even completed all the actions necessary to begin the various processes at block 320, which need to be performed so that the client device is fully authorized to begin rendering the media asset. For example, the provisioning process may begin after the user has communicated the request to the ordering system but before the user entered a password and/or confirmed a purchase.

Figure 4:
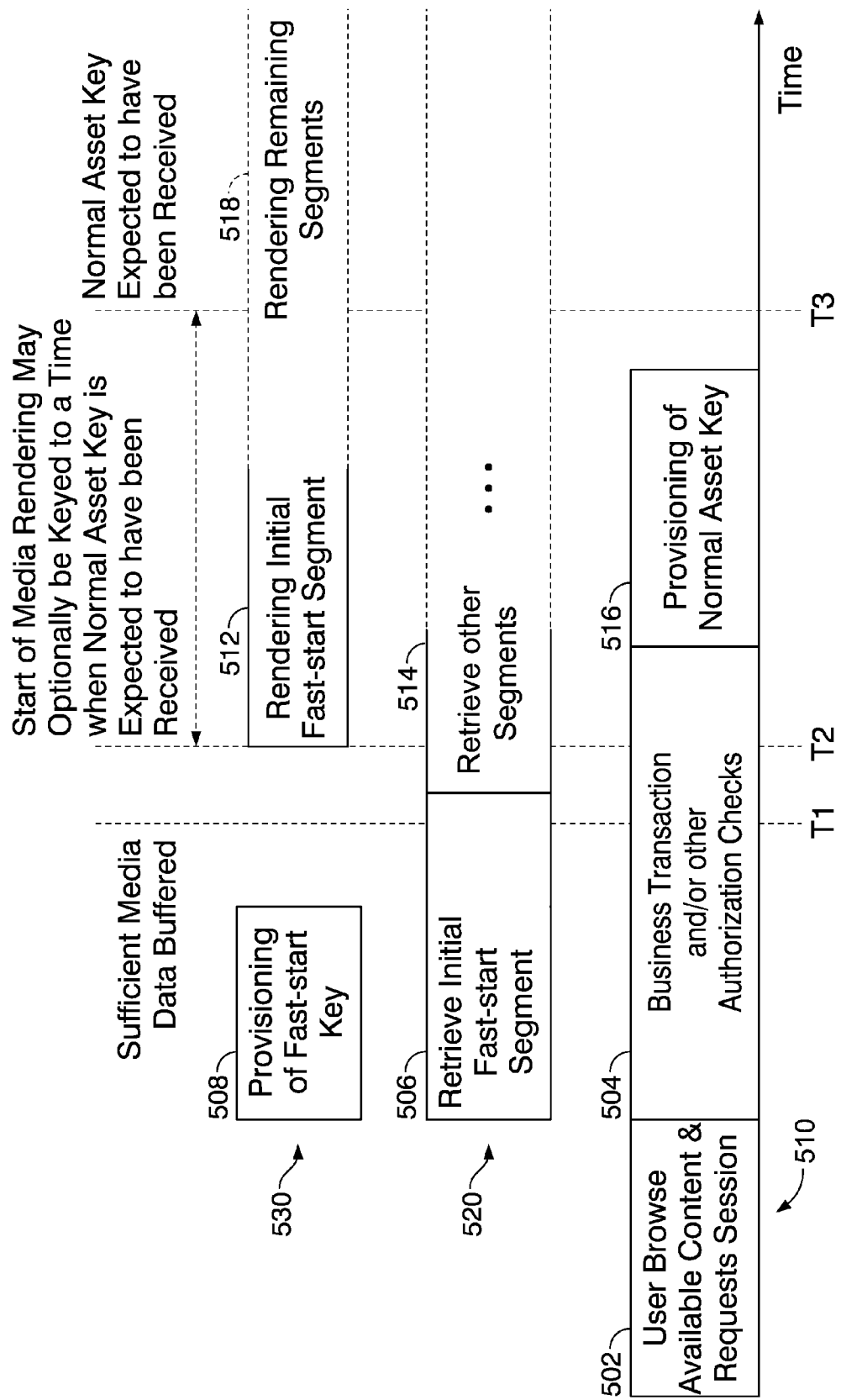
FIG. 4 shows one example of a timeline of various processes that may occur in parallel when a user initiates a streaming media session.

FIG. 4 shows one example of a timeline of various processes that may occur in parallel when a user initiates a streaming media session. Starting with the thread of activity 510 at the bottom, at block 502 the user browses the available content, selects a particular media asset and places a request to receive the media asset. The details of how the user browses, selects and requests the media asset depends on the type of system being used to stream and receive the media asset and the particulars of the system employed. Continuing with the same thread of activity, at block 504 the various processes needed to authorize the user and/or the client device are performed. Once again, the details of how these transactions are performed will depend on the type of system being used to stream the media asset and the particulars of the system employed.

The second thread of activity 520 begins at block 506 when the fast-start portion of the requested media asset is retrieved and made available to the client device. Block 506 generally begins after the user requests the media asset at block 502 and before or during the authorization process of block 504. After retrieving the fast-start portion of the requested media asset, the second thread of activity 520 continues at block 514 with the subsequent portions of the requested media asset being retrieved.

The third thread of activity 530 begins while the requested media asset is being retrieved at block 506. In particular, the third thread of activity 530 begins with the provisioning of the fast-start key at block 508. At time T1, the client device has received and buffered a sufficient amount of the fast start portion of the media asset to begin the rendering process at block 512. As shown, the rendering process in this example begins while the authorization process of block 504 is still in progress. In some cases the rendering of the fast-start portion of the media asset is delayed until time T2. By delaying the rendering of the fast-start portion in this manner a sufficient amount of time should have elapsed to allow the remaining portions 518 of the media asset to be rendered in a seamless manner with the fast-start portion so that the user does not perceive a gap between them. In this example time T3 represents the anticipated time by which the remaining segments of the media asset can be rendered using the normal cryptographic key that is provisioned at block 516 after the user and/or client device has been authorized. In some embodiments, the fast-start segments may be limited to lower-quality variants of the media asset. To implement this embodiment, it may be necessary in some cases to control the user's media player so that playback will start with a lower-quality bitrate variant protected by the fast-start key. In the case of HTTP Live Streaming, this may be accomplished by listing the lower-quality variant first in the master playlist associated with the media asset. Media players compliant with the guidance in Apple Inc.'s HTTP Live Streaming Overview document will start a playback with the first-listed variant. (See the reference entitled "HTTP Live Streaming Overview", which is available at https://developer.apple.com/library/ios/documentation/networkinginternet/conceptual/streamingmediaguide/StreamingMediaGuide.pdf, p. 18)

In some embodiments the fast-start mechanism described herein may not available for use with all types of media assets. For example, media assets may be excluded based on their content rating and/or classification so that, for example, sexually-explicit content will not be rendered in advance of the receipt of the normal asset key by the client device.

In some embodiments, an artificial delay may be introduced before the client device is able to begin rendering the fast-start segments to ensure that by the time the fast-start segment has finished playing, the normal asset key has in all likelihood been received and that the following segment will be ready for rendering. In this way the user will perceive a seamless transition between the fast-start segments and the remaining segments of the media asset.

In some embodiments the client device may determine which segments are fast start segments. The client device may make this determination in a variety of different ways. In some of the examples discussed above the identification of the fast start segments(s) is embedded in the playlists or manifests that are communicated to the client device. Of course, the identities of the fast-start segments may be communicated to the client device in other types of data structures as well.

In another implementation an implicit rule may be used to determine which segments are fast-start segments. For example, one rule could specify that the first three 6-second segments are fast start segments, and that only the subsequent (30n+1)-st segments of the media assets are fast start segments. If the same rule followed during content preparation is pre-configured into the client device, there will be no need to explicitly communicate to client device which segment(s) are designated as fast-start segments.

In some embodiments, instead of encrypting the fast-start segments with a fast-start key, the fast-start segments may be left unencrypted.

Figure 5:
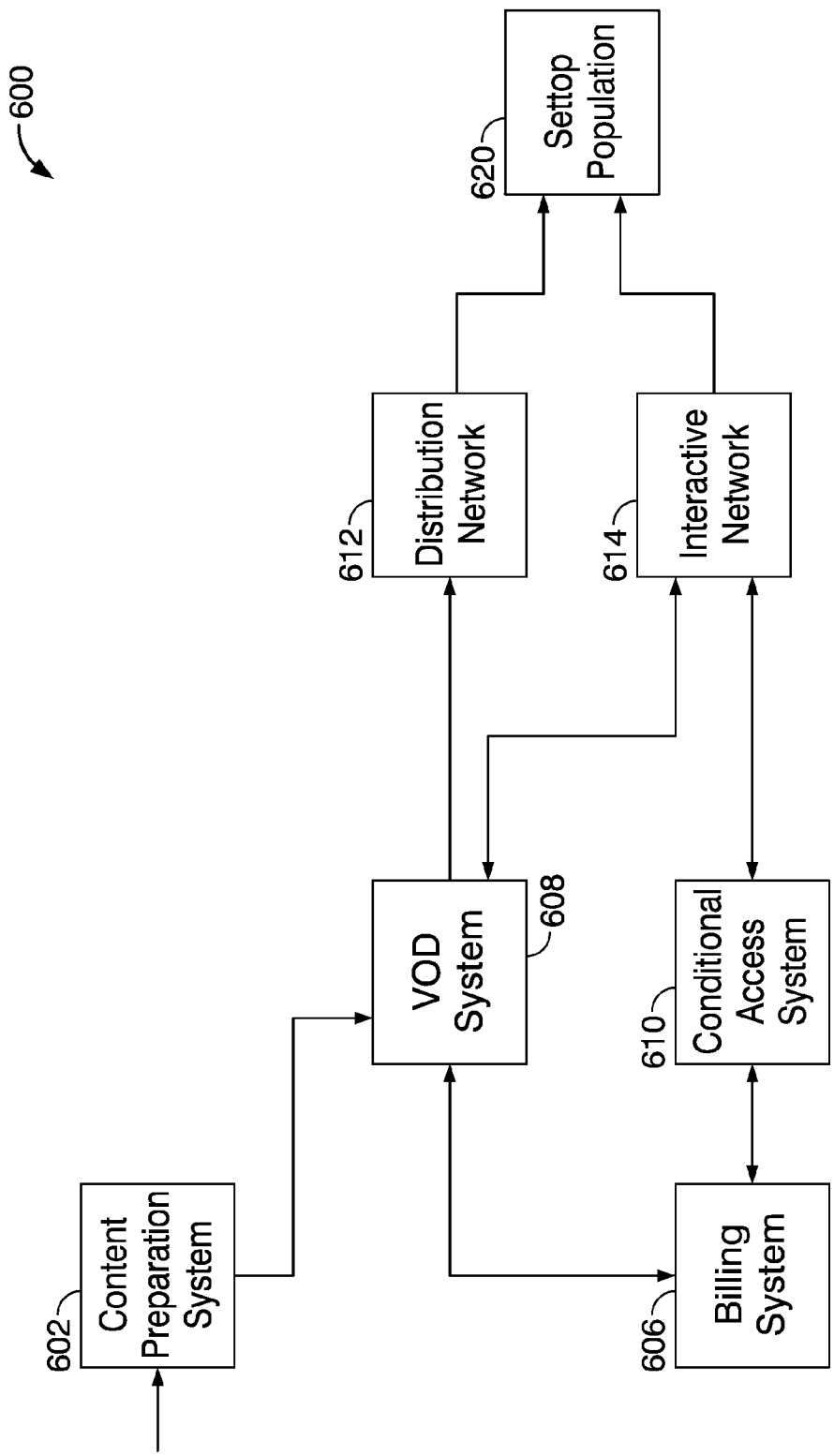
FIG. 5 illustrates one example of a system architecture that may be used to deliver on-demand content from a head-end to a client device such as a set-top box.

As previously mentioned, the techniques described herein for delivering fast-start portions of a media asset to a user may be employed in a variety of different systems and platforms. For example, in one implementation the techniques described herein may be used with a content delivery system that delivers on-demand content from a head-end to a client device such as a set-top box. FIG. 5 shows one example of a system architecture 100 for delivering pre-encrypted media asserts in this manner.

System architectures of the type shown in FIG. 5 are well-known and therefore will only be briefly described. Among other components, system architecture 600 comprises a content preparation system (CPS) 602 for pre-encrypting content, a video on-demand (VOD) system 608 storing encrypted programs for distribution to subscribers' set top boxes 620 on an on-demand basis, a conditional access system 610 for controlling one or more keys granting access to pre-encrypted content, a distribution network 612 for distributing content, and an interactive network 614 providing two-way interaction between the subscriber and the content system. Billing system 606 interfaces with both VOD system 608 and CAS 610 to maintain subscriber account information, bill subscribers, interface with VOD system 608 to provide the latter with subscriber authorization status. Although not shown, one of ordinary skill in the art would realize that other components and arrangements for achieving the various functionalities of system architecture 600 are possible. For example, a VOD system may be coupled directly to CAS 610 and functionalities consolidated in both components since both components are typically located within a cable system head end.

Key management in conditional access systems (e.g., CAS 610) typically employ messages known as entitlement control messages (ECMs) and entitlement management messages (EMMs) to control access to data streams. EMMs are control messages that convey access privileges and cryptographic keys to subscriber devices. Unlike ECMs, which are transmitted in-band in the same multiplexed stream as the content with which they are associated, EMMs are typically sent unicast-addressed to each subscriber device. That is, an EMM is usually specific to a particular subscriber. The ECMs include an encrypted traffic key for decrypting the content that is transported in the same multiplexed stream as the ECMs. The traffic key is decrypted by an access key that is derived from the cryptographic keys included in the EMMs. In some implementations, one or more of the encrypted traffic keys included with the ECMs may be configured as a fast-start key of the type described above, which is used to decrypt a fast-start portion of the media asset being received. Access to the remaining encrypted traffic keys included with the ECMs may only be made available when the user and/or client device (e.g., set top box 620) is authorized to receive the complete media asset.

Aspects of the subject matter described herein are operational with numerous general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules or components, being executed by a computer. Generally, program modules or components include routines, programs, objects, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 6:
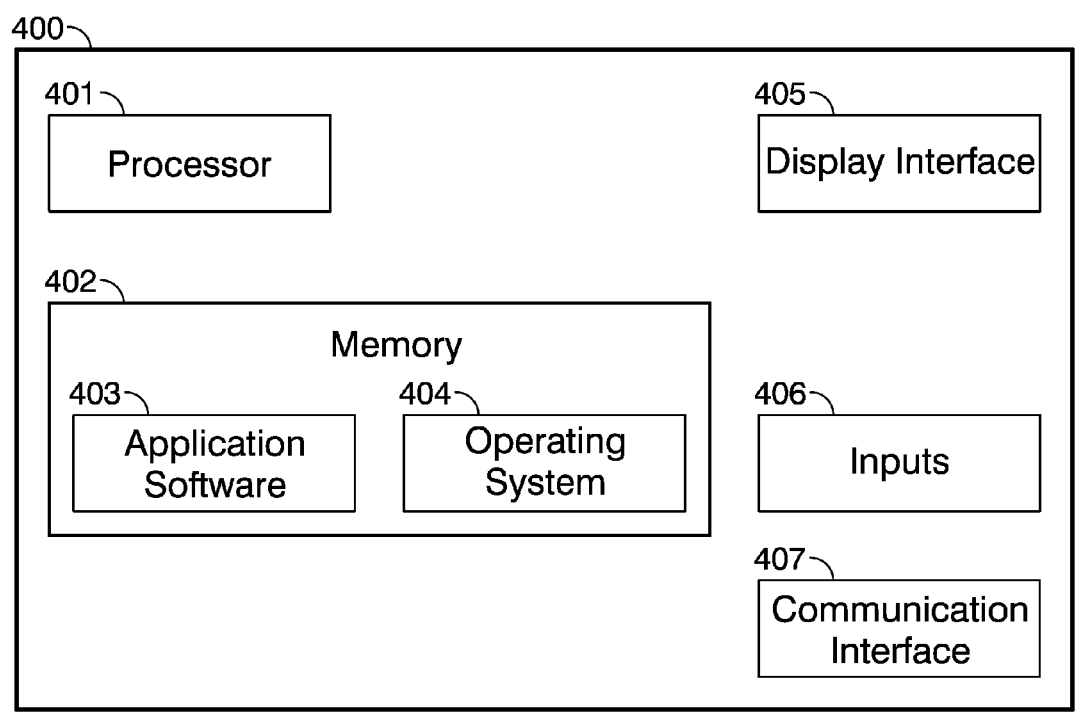
FIG. 6 illustrates various components of an illustrative computing-based device.

FIG. 6 illustrates various components of an illustrative computing-based device 400 which may be implemented as any form of a computing and/or electronic device, and in which embodiments of a server and/or a client as described above may be implemented.

The computing-based device 400 comprises one or more inputs 406 which are of any suitable type for receiving media content, Internet Protocol (IP) input, activity tags, activity state information, resources or other input. The device also comprises communication interface 407 to enable the device to communicate with one or more other entity using any suitable communications medium.

Computing-based device 400 also comprises one or more processors 401 which may be microprocessors, controllers or any other suitable type of processors for processing computing executable instructions to control the operation of the device in order to provide a search augmentation system. Platform software comprising an operating system 404 or any other suitable platform software may be provided at the computing-based device to enable application software 403 to be executed on the device.

The computer executable instructions may be provided using any computer-readable media, such as memory 402. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 405 is provided to control a display device to be used in conjunction with the computing device. The display system may provide a graphical user interface, or other user interface of any suitable type.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described are disclosed as example forms of implementing the claims.

The invention claimed is:

1. A method for delivering a streaming media asset to a client device, comprising:
   receiving over a communication network a request from a client device to play a media asset in accordance with a streaming media technique, wherein the media asset is encrypted;
   prior to fully authorizing the client device to play the media asset, providing the client device with access to a first cryptographic key that decrypts a subset of the media asset so that the client device is able to render the subset of the media asset before completion of the authorization, the subset of the media asset being less than all of the media asset; and
   subsequent to successfully fully authorizing the client device to play the media asset, providing the client with access to at least one additional cryptographic key that decrypts a remainder of the media asset,
   wherein the subset of the media received before authorization is complete is delayed before rendering, while the remainder of the media is rendered without the delay.

2. The method of claim 1, further comprising providing the client device with access to the first cryptographic key referenced in a manifest file delivered to the client device.

3. The method of claim 1, wherein the subset of the media asset corresponds to one or more complete segments of the media asset specified in a manifest file provided to the client device in accordance with the streaming media technique.

4. The method of claim 1, wherein the streaming media technique is an Adaptive Bit Rate ("ABR") streaming media technique.

5. The method of claim 1, further comprising delivering the media asset to the client device as part of a video-on-demand session.

6. The method of claim 1, further comprising delivering the subset of the media asset at a first quality level and delivering the remainder of the media asset at a second quality level higher than the first quality level.

7. The method of claim 1, wherein providing the client device with access to the first cryptographic key further comprises instructing a content security system to provision the client device with the first cryptographic key before the client device is fully authorized to play the media asset.

8. The method of claim 1, further comprising providing the client device with access to the first cryptographic key while the client device undergoes completion of the authorization process.

9. The method of claim 1, wherein providing the client device with access to the first cryptographic key further comprises causing the first cryptographic key, or information used to derive the first cryptographic key, to be delivered to the client device by a conditional access system.

10. The method of claim 9, further comprising causing the conditional access system to deliver the first cryptographic key or information used to derive the first cryptographic key in: at least one entitlement control message (ECM), at least one entitlement management message (EMM), or a combination thereof.

11. The method of claim 1, wherein providing the client device with access to the first cryptographic key prior to fully authorizing the client device to play the media asset comprises providing the client device with access to the first cryptographic key after performing partial authorization of the client device.

12. One or more non-transitory computer-readable storage media containing instructions which, when executed by one or more processors, perform a method for delivering a streaming media asset to a client device, comprising:
   responsive to a request from a client device for receipt of a streaming media asset, wherein the streaming media asset is encrypted, causing a subset of the streaming media asset to be renderable by the client device before the client device is fully authorized to render all of the streaming media asset, the subset of the streaming media asset being less than all of the media asset; and
   if the client device is fully authorized to render all of the streaming media asset, causing a remainder of the streaming media asset to be renderable by the client device,
   wherein the subset of the media received before authorization is complete is delayed before rendering, while the remainder of the media is rendered without the delay.

13. The computer-readable medium of claim 12, wherein causing the subset of the media asset to be renderable by the client device further comprises providing the client device with access to a first cryptographic key while the client device undergoes completion of the authorization process.

14. The computer-readable medium of claim 12, wherein causing the subset of the media asset to be renderable further comprises provisioning the client device with a first cryptographic key that decrypts the subset of the media asset.

15. The computer-readable medium of claim 12, further comprising provisioning the client device with a first cryptographic key by delivery of a manifest to the client device, the manifest including a universal resource indicator (URI) for the subset of the media asset and a URI for the first cryptographic key.

* * * * *